United States Patent [19]
Crease

[11] Patent Number: 4,736,332
[45] Date of Patent: Apr. 5, 1988

[54] PORTABLE PERSONAL COMPUTING SYSTEM

[75] Inventor: Pierre L. Crease, Centerville, Ohio

[73] Assignee: NCR Corporation, Dayton, Ohio

[21] Appl. No.: 727,944

[22] Filed: Apr. 26, 1985

[51] Int. Cl.⁴ .............................................. G06F 1/00
[52] U.S. Cl. .................................................. 364/708
[58] Field of Search ........................... 364/708, 705; 361/393–395

[56] References Cited

U.S. PATENT DOCUMENTS

| D. 253,438 | 11/1979 | Markley | D3/76 |
|---|---|---|---|
| D. 256,189 | 8/1980 | Rapoport | D3/76 |
| D. 260,202 | 8/1981 | Middleton, Jr. | D3/72 |
| D. 266,208 | 9/1982 | Cannon et al. | D3/74 |
| D. 267,834 | 2/1983 | Yew | D3/74 |
| D. 277,284 | 1/1985 | Horne | D14/100 |
| 3,920,979 | 11/1975 | Kilby et al. | 364/705 |
| 4,084,213 | 4/1978 | Kirchner et al. | 361/384 |
| 4,222,109 | 9/1980 | Siwula | 364/705 |
| 4,224,675 | 9/1980 | Pinkerman | 364/705 |
| 4,294,496 | 10/1981 | Murez | 312/208 |
| 4,308,588 | 12/1981 | Siwula | 364/705 |
| 4,370,727 | 1/1983 | Bellet | 364/705 |
| 4,496,943 | 1/1985 | Greenblatt | 364/708 |
| 4,497,036 | 1/1985 | Dunn | 364/708 |
| 4,617,640 | 10/1986 | Kishi et al. | 364/708 |
| 4,669,053 | 5/1987 | Krenz | 364/708 |

FOREIGN PATENT DOCUMENTS

| 0066664 | 12/1982 | European Pat. Off. . |
| 2100065 | 12/1982 | United Kingdom . |
| 2143117 | 7/1983 | United Kingdom . |
| 2128783 | 5/1984 | United Kingdom . |

Primary Examiner—Gary V. Harkcom
Assistant Examiner—Dale M. Shaw
Attorney, Agent, or Firm—Wilbert Hawk, Jr.; Albert L. Sessler, Jr.; Elmer Wargo

[57] ABSTRACT

A portable personal computing system which is especially adaptable for use in a container like an attaché case. When the container is opened to an operating position, a keyboard unit, a display unit, and a read/write unit like a disc drive unit are positioned ready for use by an operator. Special mounting members for these units are used to automatically position these units for operation when the container is opened.

7 Claims, 6 Drawing Sheets

PORTABLE PERSONAL COMPUTING SYSTEM

BACKGROUND OF THE INVENTION

This invention relates to a portable computing system which is especially adaptable for use in a container like an attaché case.

In recent years there have been efforts to make personal computing systems smaller and more portable. Some of these small portable systems have small displays and tape cassettes for inputs. Other larger, portable computers have disc drives located and exposed at the sides of the units, making them vulnerable to damage.

SUMMARY OF THE INVENTION

In contrast with some of the mentioned, prior-art, portable computing systems, the computing system of the present invention is especially adaptable for incorporation into a carrying container like an attaché case.

A preferred embodiment of this invention comprises: a container having first second sections and means enabling said first and second sections to be moved between a closed position for transporting said computing system and an open position for operating said computing system; said enabling means also enabling said first and second sections to be secured together in said closed position and to be held in said open position when moved thereto; a keyboard unit and first mounting means for mounting said keyboard unit in said container; a display unit and second mounting means for mounting said display unit in said container; at least one read/write unit for receiving and writing data, and third means for mounting said read/write unit in said container; said first, second, and third mounting means being effective to present said keyboard unit, said display unit, and said read/write unit, respectively, in operating positions when said first and second sections are moved from said closed position to said open position; means for computing; and means for coupling said keyboard unit, said display unit, said read/write unit, and said computing means to provide said computing system.

An advantage of this invention is that it is simple and inexpensive to implement.

Another advantage is that the keyboard unit, display unit, and read/write unit are presented in an operating position when the container is opened to the operating position.

Another advantage is that when the container containing the computing system of this invention is closed, the computing system appears to be just an attaché case, thereby minimizing the risk of theft of the computing system.

These advantages and others will be more readily understood in connection with the following specification, claims and drawing.

DETAILED DESCRIPTION OF THE INVENTION

Figure 1:
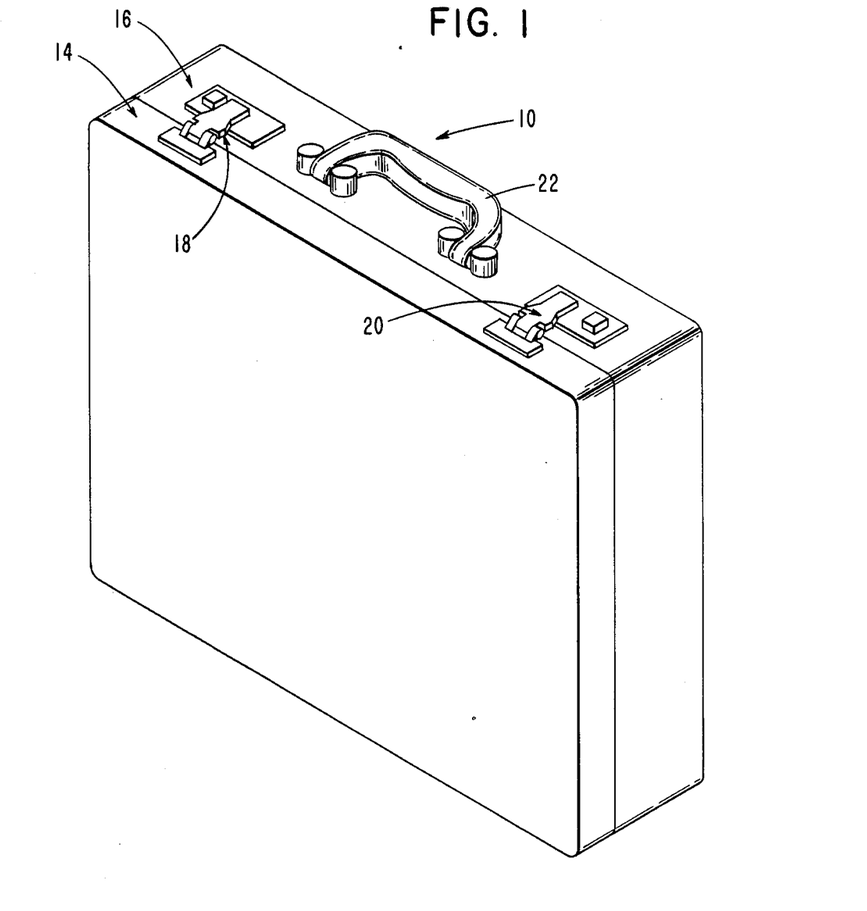
FIG. 1 is a general, perspective view of a preferred embodiment of this invention showing its appearance when the container (attaché case) is in the closed position.
Figure 3:
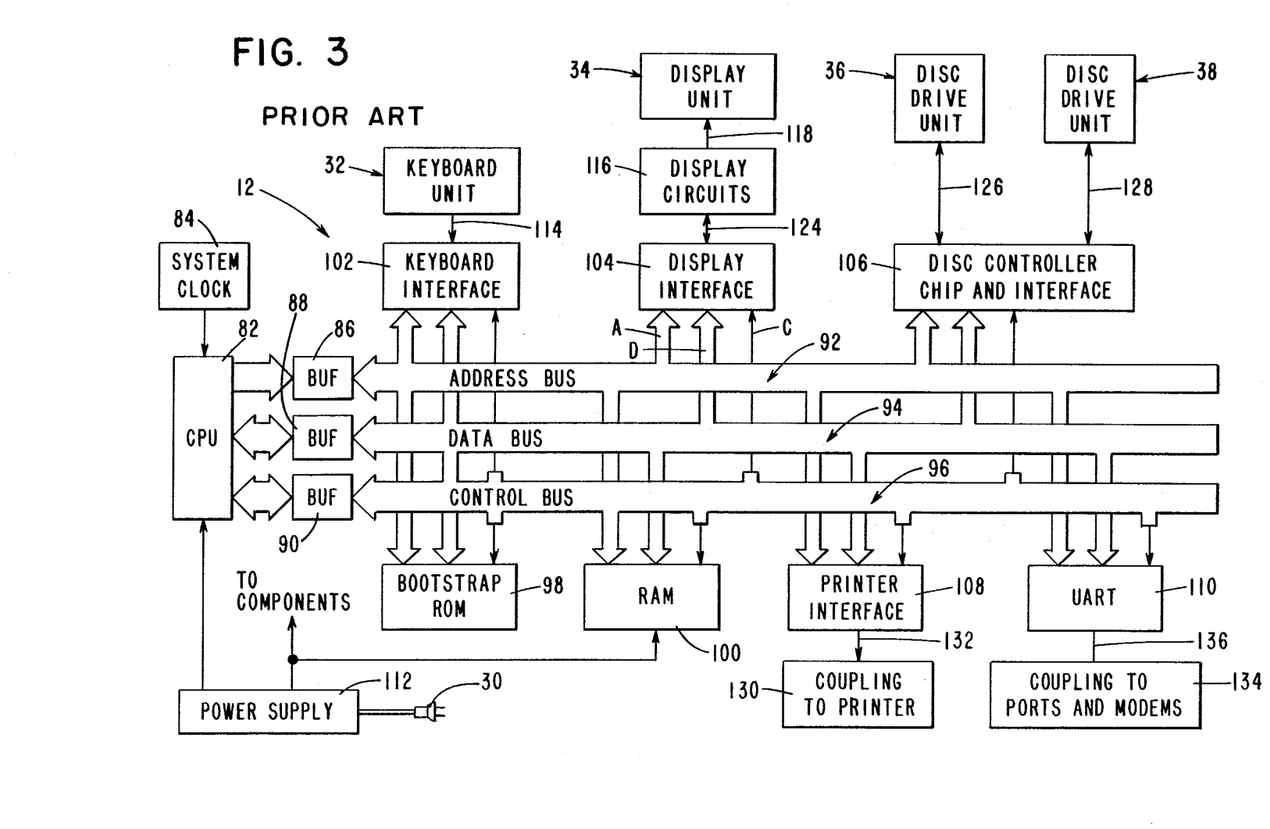
FIG. 3 is a schematic diagram of the computing system incorporated into the container shown in FIGS. 1 and 2.

FIG. 1 is a general, perspective view of a container 10 which houses a known computing system 12, shown schematically in FIG. 3. In the preferred embodiment, the container 10 is an attaché case. The container 10 is comprised of first and second sections 14 and 16, respectively, which are shown in the closed position in FIG. 1 for transporting it. Conventional locks 18 and 20 are used to lock the two sections 14 and 16 together, and a handle 22 is used for carrying the container 10.

Figure 2:
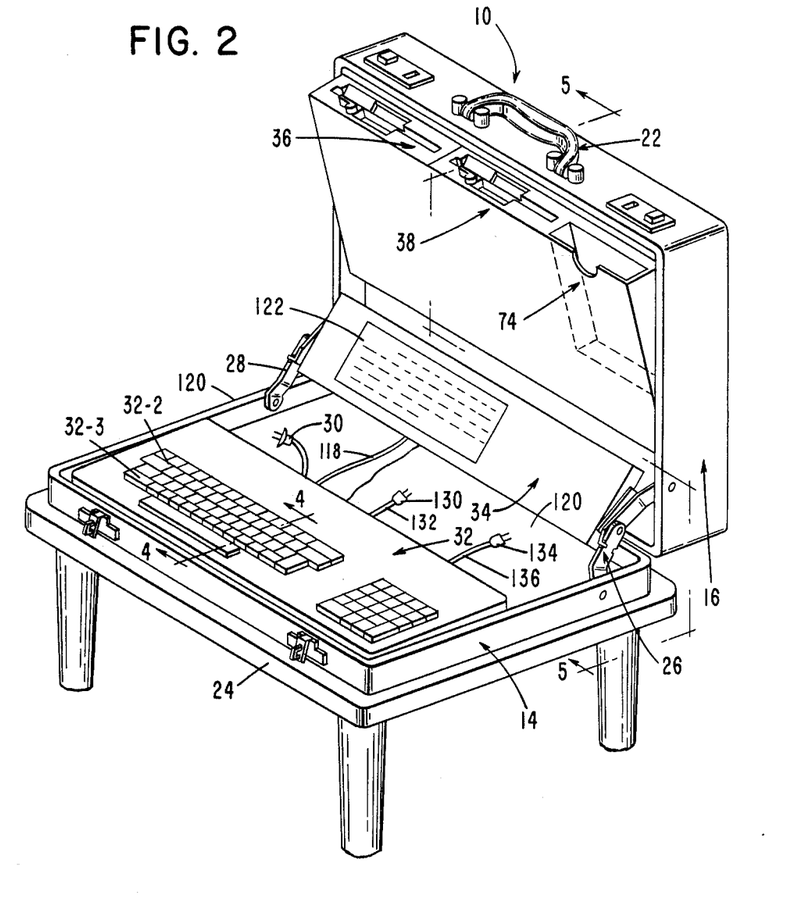
FIG. 2 is a general, perspective view of the computing system of this invention showing a keyboard unit, a display unit, and a read/write unit which are ready for operation when the container is opened.

When the system 12 is to be used, the first section 14 of the container 10 is placed on a table 24, for example, the locks 18 and 20 are opened, and the second section 16 is raised to the open or operating position shown in FIG. 2. The second section 16 forms an angle of less than 90 degrees with the first section 14 when the container 10 is in the operating position, and it is held in this position by a hinge 25 (FIG. 5) and by support members 26 and 28 which will be described further hereinafter.

When the container 10 is in the operating position shown in FIG. 2, an electrical plug 30 is inserted into a 110 VAC outlet (not shown) to provide power to the system 12. Notice that when the section 16 is raised to the position shown in FIG. 2, the system 12 is ready for operation. In this regard, a keyboard unit 32, a display unit 34, and read/write units such as disk drive units 36 and 38 are properly positioned for use by an operator. Before discussing the operation of the system 12, it appears appropriate to discuss how the various elements already discussed are mounted within the container 10.

Figure 4:
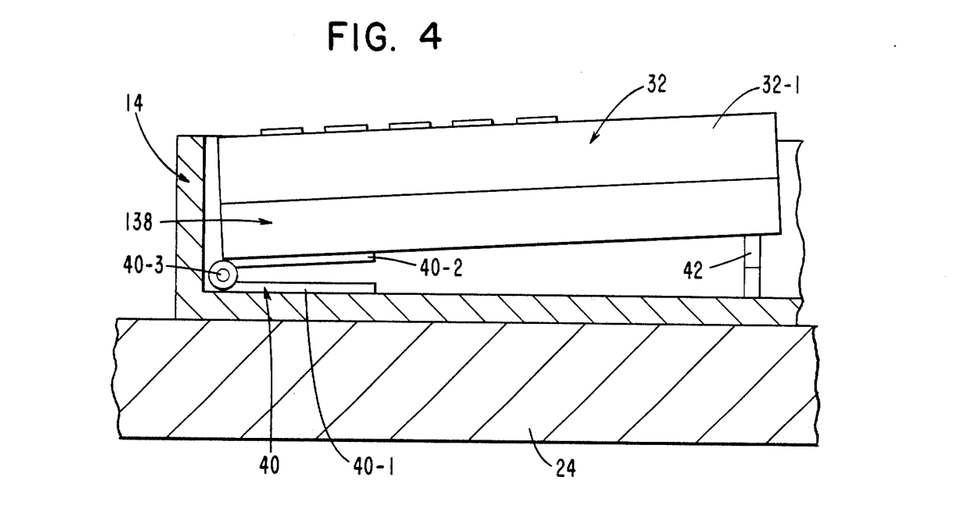
FIG. 4 is a cross-sectional view, taken along the line 4—4 of FIG. 2, and it is used to show the means for mounting the keyboard unit within the container.

The means for mounting the keyboard unit 32 within the container 10 is shown in FIG. 4, and this means includes a hinge 40 and a stop 42. One leaf 40-1 of the hinge 40 is secured to the first section 14, and the remaining leaf 40-2 is secured to the keyboard unit 32 to enable the unit 32 to pivot slightly about the hinge pin 40-3. The stop 42 is conventional and adjustable and is used to enable the end 32-1 of the keyboard unit 32 to be supported in a raised position when the keyboard unit 32 is pivoted slightly about the hinge pin 40-3 (counterclockwise as viewed in FIG. 4) to change the angle of the keyboard unit 32 relative to the table 24 to suit operator preferences. The hinge 40 may also be a conventional separable hinge which permits the keyboard unit to be removed from the container 10 to accommodate operator preference. Prior to closing the container 10, the stop 42 is returned to its lower position to provide for compactness within the container 10.

The means for mounting the display unit 34 within the container 10 includes the support members 26 and 28 (FIG. 2) alluded to earlier herein. Because the support members 26 and 28 are identical, except for being mirror images of each other, a discussion of only support member 26 will follow.

Figure 5:
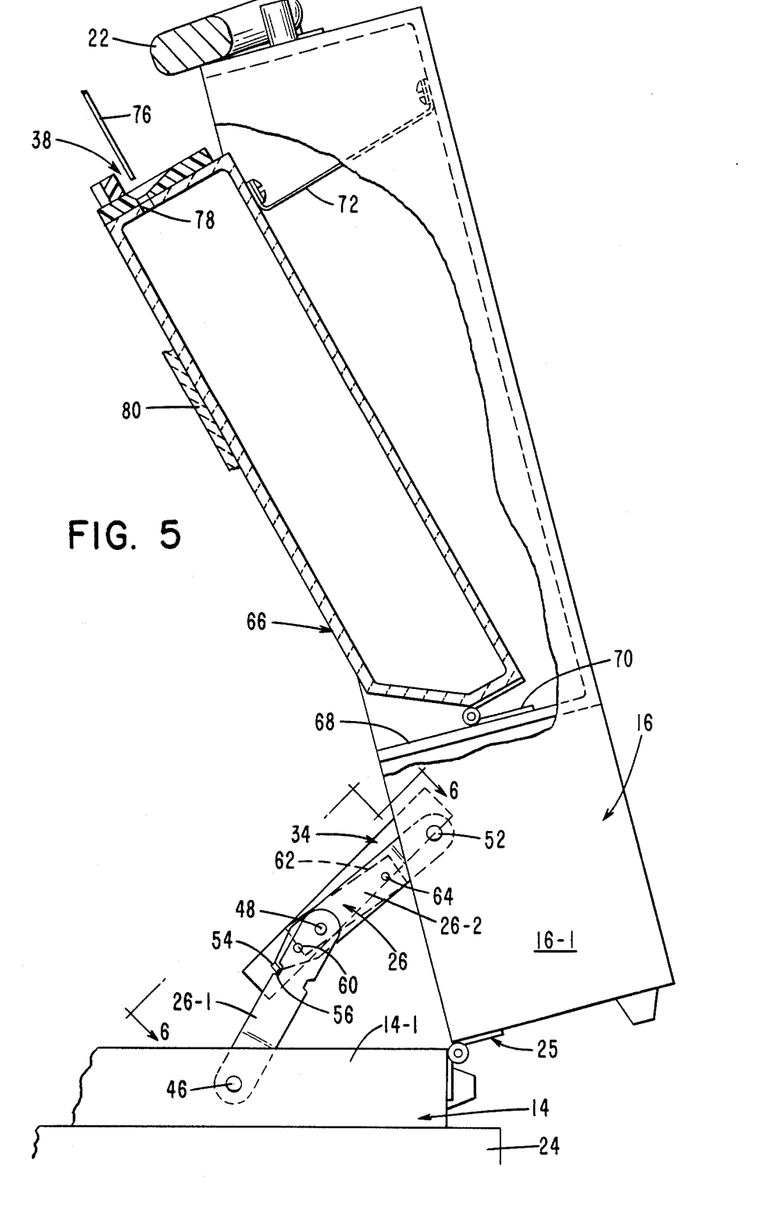
FIG. 5 is a view which is taken along the general line 5—5 in FIG. 2 to show additional details of the means for mounting the display unit and the read/write units.
Figure 6:
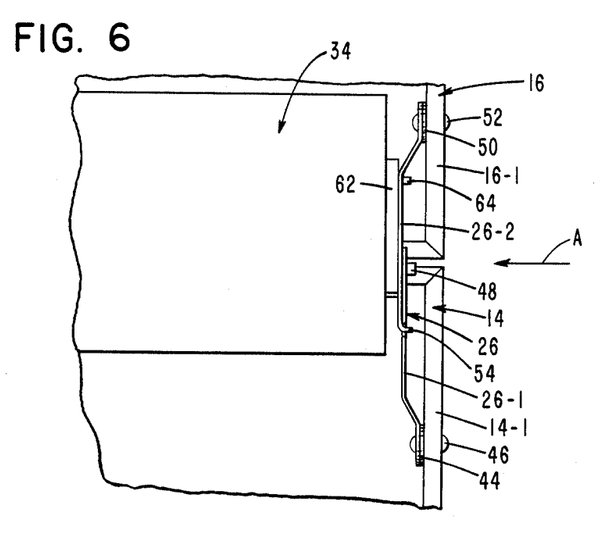
FIG. 6 is a view taken along the general line 6—6 of FIG. 5 to show additional details of the means for mounting the display unit.
Figure 7:
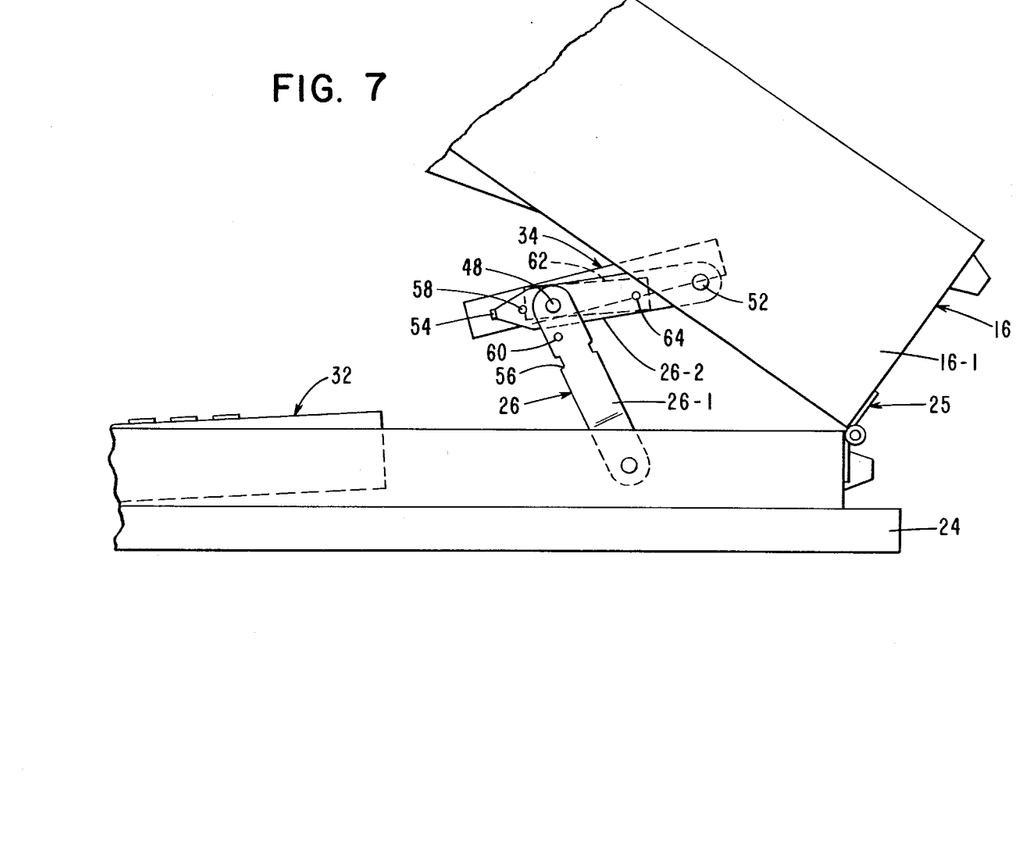
FIG. 7 is an end view in elevation which is taken from the direction of arrow A in FIG. 6 to show the movement of the display unit as the second section of the container is moved towards the closed position.

The support member 26 is comprised of two links 26-1 and 26-2 as shown in FIGS. 5, 6, and 7. Link 26-1 has one end pivotally joined to a sidewall 14-1 of the first section 14 by a washer 44 and a fastener 46 as shown best in FIG. 6. The remaining end of link 26-1 is pivotally joined to link 26-2 (between its ends) by a fastener 48. One end of link 26-2 is pivotally joined to the sidewall 16-1 of the second section 16 by a washer 50 and a fastener 52 as shown best in FIG. 6, and the remaining end of link 26-2 has an offset portion or tang 54 thereon. The tang 54 fits into a notch 56 (FIG. 5) in the link 26-1 when the second section 16 is in the raised or open position relative to the first section 14 (as shown in FIG. 5) to "lock" the second section 16 in the position shown. To lower the second section 16, the link 26-1 is simply moved or pivoted about fastener 46 in a counterclockwise direction as viewed in FIG. 5, causing the second section 16 to assume the position shown in FIG. 7 before coming in contact with the first section 14 for closing. The remaining support member 28 (FIG. 2) operates in the same manner as does support member 26. The link 26-2 has a slight projection or detent 58 (FIG. 7) which mates with a cooperating recess 60 on link 26-1 to help support the second section 16 in the position shown in FIG. 5.

The support members 26 and 28 also perform the function of moving the display unit 34 from a first position in which the display unit 34 is substantially parallel to the first section 14 when the container 10 is closed and for moving the display unit 34 to a second position, shown in FIG. 5, where the display unit 34 is positioned at a proper viewing angle for a user of the system 10 who is operating the keyboard unit 32. In this regard, there is a spacer block 62 (FIGS. 5, 6, and 7) positioned between the display unit 34 and the link 26-2, and the fastener 48, which couples the links 26-1 and 26-2 together, is also used to secure one end of the spacer block 62 to the link 26-2. The remaining end of the spacer block 62 is secured to the link 26-2 by a fastener 64. The spacer block 62 is secured to the display unit 34 by a suitable adhesive. There is a similar spacer block (not shown) associated with the support member 28 to secure the opposite side of the display unit 34 to the support member 28.

The means for mounting disc drive units 36 and 38 is shown in FIGS. 2 and 5, and it includes the supporting member or chamber 66 shown in FIG. 5. The supporting chamber 66 is essentially a narrow but wide container which has its lower end pivotally joined to a cross member 68 by a hinge 70. The cross member 68 is supported within the second section 16. The movement of the supporting chamber 66 out of the second section 16 is limited by a flexible tension member 72 as shown in FIG. 5. When the container 10 is in the operating position shown in FIG. 5, the first section 14 and the second section 16 are held apart at an included angle of less than 90 degrees causing the center of gravity of the chamber 66 to produce a turning moment which pivots the chamber 66 about the hinge 70 to the operating position shown.

The supporting chamber 66 is divided into three compartments, as shown in FIG. 2, for the preferred embodiment being described. Disc drive unit 36 is placed in one compartment, disc drive unit 38 is placed in the second compartment, and the third compartment 74 may be used for the storage of floppy discs associated with the disc drive units 36 and 38. A floppy disc 76 (only a portion shown in FIG. 5) is aligned with the receiving slot 78 for insertion into the disc drive unit 38 shown only in dashed outline in FIG. 5. The supporting chamber 66 has attractive padding material 80 (FIG. 5) located at least on the side which faces the keyboard unit 32 so that these two units are insulated from shock or damage when the second section 16 is moved towards the first section 14 for closing. The tension member 72 (FIG. 5) also keeps the supporting member 66 from crashing against the keyboard unit 14 as the container 10 is closed.

The computing system 12 which is housed in the container 10 is shown in FIG. 3. Because the computing system 12 is conventional, it will be described only briefly herein. The system 12 includes a central processing unit (CPU) 82 and system clock 84 along with buffers 86, 88, and 90 which are used to couple the address bus 92, data bus 94, and control bus 96, respectively, to the CPU 82. The system 12 also includes a bootstrap ROM 98, a RAM 100, a keyboard interface 102, a display interface 104, a disc controller chip and interface 106, a printer interface 108, and a communication interface such as the universal asynchronous receiver transmitter (UART) 110, with each of the component elements mentioned in this sentence being coupled to the address bus 92, the data bus 94, and the control bus 96 as shown by lines A, D, and C, respectively, which are shown only for the display interface 104 to simplify the drawing. The system 12 also includes a power supply 112 which converts 110 VAC to the necessary voltage levels for the various components shown in FIG. 3. While the system 12 is shown as being operated form 110 VAC, the power supply 112 could also represent a battery-operated system where appropriate.

The keyboard unit 32 is connected to the keyboard interface 102 by conductors shown as 114. The display unit 34 is coupled to display circuits 116 by conductors 118 which are routed under fabric 120 (partially broken away in FIG. 2) to protect the conductors and to present a neat appearance for the interior of the container 10. In the embodiment described, the display unit 34 is of the liquid crystal variety to provide compactness. The data to be displayed appears within the rectangle 122, although other designs or layouts be used. The display circuits 116 associated with the particular display unit 34 used are coupled to the display interface 104 by conductors 124.

The disc drive unit 36 and the disc drive unit 38 are coupled to the disc controller chip and interface 106 by conductors 126 and 128, respectively, which also are located under the fabric 120 (FIG. 2) to present a neat appearance to the interior of the container 10.

In order to couple the computing system 12 to a printer, for example, a coupling 130 and associated conductor 132 (FIG. 2) are used to couple the printer interface 108 (FIG. 3) to a printer (not shown). Similarly, in order to couple the computing system 12 to various ports or modems, a coupling 134 and associated conductor 136 are used to couple these ports and modems to the UART 110 shown in FIG. 3. The couplings 130 and 134 are shown only schematically in FIG. 3. In certain situations, the modems may be included on a printed circuit card which is part of the system 12.

The elements of the computing system 12 such as the CPU 82, RAM 100 and various interfaces like 102 and 106, for example, are located in a compartment 138 (FIG. 4) which is located in the keyboard unit 32. Naturally, the size of the container 10 may be adjusted to accommodate the particular computing system 12 employed.

When the container 10 is opened to the operating position shown in FIG. 2, the computing system 12 may be conventionally operated by entering data and instructions on the keys 32-2, 32-3, for example, of the keyboard unit 32, by using the disc drive units 36 and 38 and the display unit 34, and by outputting data to peripheral devices like a printer via the coupling 130.

I claim:

1. A portable computing system comprising:
   a container having first and second sections, a hinge, and first and second support members enabling said first and second sections to be moved between a closed position for transporting said computing system and an open position for operating said computing system; said hinge and aaid first and second support members also enabling said first and second sections to be secured together in said closed position and to be held in said open position when moved thereto;
   a keyboard unit and first mounting means for mounting said keyboard unit in said container;
   a display unit and second mounting means for mounting said display unit to said first and second support members in said containers;
   at least one read/write unit for receiving and writing data, and third mounting means for mounting said read/write unit in said container;
   said first, second, and third mounting means being effective to present said keyboard unit, said display unit, and said read/write unit, respectively, in operating positions when said first and second sections are moved from said closed position to said open position;
   means for computing; and
   means for coupling said keyboard unit, said display unit, said read/write unit, and said computing means to provide said computing system;
   said keyboard unit being mounted in said first section by said first mounting means, and said first section becoming a base for said system when said first and second sections are moved to said open position for operating said computing system;
   said container having the appearance of an attaché case; and
   said third mounting means utilizing gravity to move said read/write unit into said operating position as said first and second sections are moved to said open position.

2. The system as claimed in claim 1 in which said hinge and said first and second support members include holding means for holding said first and second sections in said open position;
   said display unit being generally planar and said second mounting means being coupled to said first and second support members to move said display unit from a first position in which said display unit is parallel to said first section when said container is in said closed position to a second position in which said display unit is positioned at a viewing angle relative to an operator using said keyboard unit when said container is in said open position.

3. The system as claimed in claim 2 in which said third mounting means includes a supporting chamber for supporting said read/write unit therein and means for pivotally mounting said supporting chamber in said second section between inoperative and operative positions therein whereby said supporting chamber is moved by gravity to said operative position when said container is in said open position to thereby present said read/write unit for use.

4. The system as claimed in claim 3 in which said means for pivotally mounting said supporting chamber in said second section also includes means for limiting the movement of said supporting chamber away from said inoperative position to said operative position.

5. The system as claimed in claim 4 in which said read/write unit is a disk unit and said supporting chamber also includes a compartment for storing discs associated with said disc unit.

6. A portable computing system comprising:
   a container having first and second sections, a hinge, and first and second support members enabling said first and second sections to be moved between a closed position for transporting said computing system and an open position for operating said computing system; said hinge and said first and second support members also enabling said first and second sections to be secured together in said closed position and to be held in said open position when moved thereto;
   a keyboard unit and first mounting means for mounting said keyboard unit in said container;
   a display unit and second mounting means for mounting said display unit to said first and second support members in said container;
   at least one read/write unit for receiving and writing data, and third mounting means for mounting said read/write unit in said container;

said first, second, and third mounting means being effective to prevent said keyboard unit, said display unit, and said read/write unit, respectively, in operating positions when said first and second sections are moved from said closed position to said open position;

means for computing; and means for coupling said keyboard unit, said display unit, said read/write unit, and said computing means to provide said computing system;

said keyboard unit being mounted in said first section by said first mounting means, and said first section becoming a base for said system when said first and second sections are moved to said open position for operating said computing system;

said hinge and said first and second support members including holding means for holding said first and second sections in said open position;

said display unit being generally planar and said second mounting means being coupled to said first and second support members to move said display unit from a first position in which said display unit is parallel to said first section when said container is in said closed position to a second position in which said display unit is positioned at a viewing angle relative to an operator using said keyboard unit when said container is in said open position;

said third mounting means including a supporting chamber for supporting said read/write unit therein and means for pivotally mounting said supporting chamber in said second section between inoperative and operative positions therein whereby said supporting chamber is moved by gravity to said operative position when said container is in said open position to thereby present said read/write unit for use;

said means for pivotally mounting said supporting chamber in said second section also including means for limiting the movement of said supporting chamber away from said inoperative position to said operative position;

said read/write unit being a disk unit and said supporting chamber also including a compartment for storing discs associated with said disc unit;

said first mounting means including a hinge for pivotally joining said keyboard unit at one side thereof to said first section and also including adjustment means for changing the angle of said keyboard unit relative to an operator using said keyboard unit when said container is in said open position.

7. The system as claimed in claim 6 in which said container has the appearance of an attaché case having a deep section and a lid section; said first and second sections of said container corresponding to said lid and deep sections, respectively.

* * * * *

UNITED STATES PATENT AND TRADEMARK OFFICE
CERTIFICATE OF CORRECTION

PATENT NO. : 4,736,332
DATED : April 5, 1988
INVENTOR(S) : Pierre L. Crease

It is certified that error appears in the above—identified patent and that said Letters Patent is hereby corrected as shown below:

Column 5, line 50, delete "aaid" and substitute --said--.

Column 5, line 59, delete "containers" and substitute --container--.

Column 7, line 2, delete "prevent" and substitute --present--.

Signed and Sealed this

Twenty-third Day of August, 1988

Attest:

DONALD J. QUIGG

Attesting Officer

Commissioner of Patents and Trademarks